United States Patent
Norrie

(10) Patent No.: US 7,694,025 B1
(45) Date of Patent: Apr. 6, 2010

(54) METHOD AND DEVICE FOR BASE ADDRESS SORTING AND ENTRY INTO BASE ADDRESS REGISTERS

(75) Inventor: Christopher I. W. Norrie, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 201 days.

(21) Appl. No.: 11/395,918

(22) Filed: Mar. 31, 2006

(51) Int. Cl.
*G06F 3/00* (2006.01)
(52) U.S. Cl. .............................. 710/3; 710/9
(58) Field of Classification Search .............. 710/3
See application file for complete search history.

(56) References Cited

U.S. PATENT DOCUMENTS

| | | | |
|---|---|---|---|
| 4,638,431 A | 1/1987 | Nishimura | |
| 4,641,302 A | 2/1987 | Miller | |
| 4,727,480 A * | 2/1988 | Albright et al. | 703/25 |
| 5,247,691 A | 9/1993 | Sakai | |
| 5,706,460 A * | 1/1998 | Craig et al. | 712/204 |
| 5,761,726 A | 6/1998 | Guttag et al. | |
| 5,867,677 A | 2/1999 | Tsukamoto | |
| 5,884,297 A | 3/1999 | Noven | |
| 5,915,097 A | 6/1999 | Chao | |
| 6,005,863 A | 12/1999 | Deng et al. | |
| 6,378,047 B1 | 4/2002 | Meyer | |
| 6,490,288 B1 | 12/2002 | Lin et al. | |
| 6,539,536 B1 | 3/2003 | Singh et al. | |
| 6,810,037 B1 | 10/2004 | Kalapathy et al. | |
| 7,061,861 B1 | 6/2006 | Mekkittikul et al. | |
| 7,124,200 B2 | 10/2006 | Sato et al. | |
| 2001/0002907 A1* | 6/2001 | Jeong et al. | 370/392 |
| 2002/0009050 A1 | 1/2002 | Ueno | |
| 2002/0087837 A1* | 7/2002 | Samra et al. | 712/217 |
| 2002/0194486 A1* | 12/2002 | Heinrich et al. | 713/200 |
| 2003/0023836 A1* | 1/2003 | Catherwood et al. | 712/225 |
| 2003/0126535 A1* | 7/2003 | Solomon et al. | 714/746 |
| 2004/0044798 A1 | 3/2004 | Elzur et al. | |
| 2004/0162963 A1* | 8/2004 | Cedola | 712/1 |

(Continued)

OTHER PUBLICATIONS

Main, Data Structure & Other Objects Using Java, 1999, Addison-Wesley, pp. 526-529 and 575-582.

(Continued)

*Primary Examiner*—Henry W. H. Tsai
*Assistant Examiner*—John B Roche
(74) *Attorney, Agent, or Firm*—Michael R. Hardaway; Kenneth Glass; Glass & Associates

(57) ABSTRACT

A base address sorting device in a serial switch is disclosed which includes an array of shadow registers, each shadow register in the array being electrically coupled to a base address register, in an array of base address registers, each of the base address registers having a base address, and control logic circuitry electrically coupled to the array of shadow registers and to the array of base address registers with the control logic circuitry being operable, when it receives a configuration command, to implement a method, for reconfiguring the contents of the array of base address registers, including: inserting a new base address from the configuration command into a shadow register in the array of shadow registers, sorting the array of shadow registers into a predetermined order, and then copying the contents of the array of shadow registers into the array of base address registers.

18 Claims, 9 Drawing Sheets

U.S. PATENT DOCUMENTS

| | | |
|---|---|---|
| 2004/0202379 A1 | 10/2004 | Boskovic et al. |
| 2005/0220129 A1* | 10/2005 | Boyd ........................ 370/428 |
| 2006/0114918 A1 | 6/2006 | Ikeda et al. |
| 2006/0117126 A1 | 6/2006 | Leung et al. |
| 2006/0174048 A1 | 8/2006 | Ohara et al. |
| 2006/0221954 A1 | 10/2006 | Naranyan et al. |
| 2006/0242352 A1 | 10/2006 | Torudbakken et al. |
| 2006/0253619 A1 | 11/2006 | Torudbakken et al. |
| 2007/0097948 A1 | 5/2007 | Boyd et al. |
| 2007/0097950 A1 | 5/2007 | Boyd et al. |
| 2007/0147359 A1 | 6/2007 | Congdon et al. |
| 2007/0183393 A1 | 8/2007 | Boyd et al. |
| 2007/0266179 A1 | 11/2007 | Chavan et al. |

OTHER PUBLICATIONS

PCE Express Base Specification, Mar. 2005, PCI Express, pp. 1-508.
Xilinx, Using Look-up tables as shift registers in Spartan-3 devices, Xilinx, 2003, pp. 1-18.
Ravi Budruk et al., PCI Express System Architecture, Mindshare, 2003, Page numbers not available from electronic edition.

* cited by examiner

METHOD AND DEVICE FOR BASE ADDRESS SORTING AND ENTRY INTO BASE ADDRESS REGISTERS

BACKGROUND OF THE INVENTION

Peripheral Component Interconnect (PCI) Express is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, a PCI Express switch chip, and various external devices. So far, PCI Express switching has only been implemented in a limited number of external devices.

One three-port PCI Express serial switch performs simultaneous comparisons of the target address value of an incoming data packet with the addresses of all possible directly-connected external devices. Since each external device's addressing is defined by a base address and a limit address, there are six comparisons performed for each port. A communication packet can arrive at any of the three ports, as many as 18 comparisons can be required to be performed in parallel within the PCI Express switch.

However, in recent years, as the speed of processors has increased and the size of processing systems has reduced in an unprecedented rate, the demand for more external devices has also increased. PCI Express serial switches will develop to accommodate more ports and thus more external devices. As port counts grow, though, the internal circuitry grows exponentially. A sixteen port switch, for example, can require 512 or more base and limit address comparisons for an incoming communication packet, using conventional switch architecture. Switches having 512 comparators to implement the comparisons are undesirable since comparators take up chip space, consume power, and increase latency of the system.

Thus, there is a need for a method and apparatus that will accommodate connection of a large number of external devices to a serial switch without using an exponentially increased number of comparators and registers and achieving high performance at the same time.

SUMMARY OF THE INVENTION

A novel device and method for base address sorting and entry of base addresses into base address registers is presented in order to support rapid binary address searching. The method is implemented in a PCI Express serial switch and accommodates a large number of ports without using the expected exponentially-increased number of comparators and registers. In addition, the device enables a serial switch to insert a new base address into an array of base address registers quickly and accurately, without the need to implement a large number of comparators, and without interrupting rapid switching operations in the switch.

A base address sorting device in a serial switch is disclosed which includes an array of shadow registers, each shadow register in the array being electrically coupled to a base address register, in an array of base address registers, each of the base address registers having a base address, and control logic circuitry electrically coupled to the array of shadow registers and to the array of base address registers with the control logic circuitry being operable, when it receives a configuration command, to implement a method, for reconfiguring the contents of the array of base address registers, including: inserting a new base address from the configuration command into a shadow register in the array of shadow registers, sorting the array of shadow registers into a predetermined order, and then copying the contents of the array of shadow registers into the array of base address registers.

These and other objects and advantages of the present invention will become obvious to those of ordinary skill in the art after having read the following detailed description of the preferred embodiments which are illustrated in the various drawing figures.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
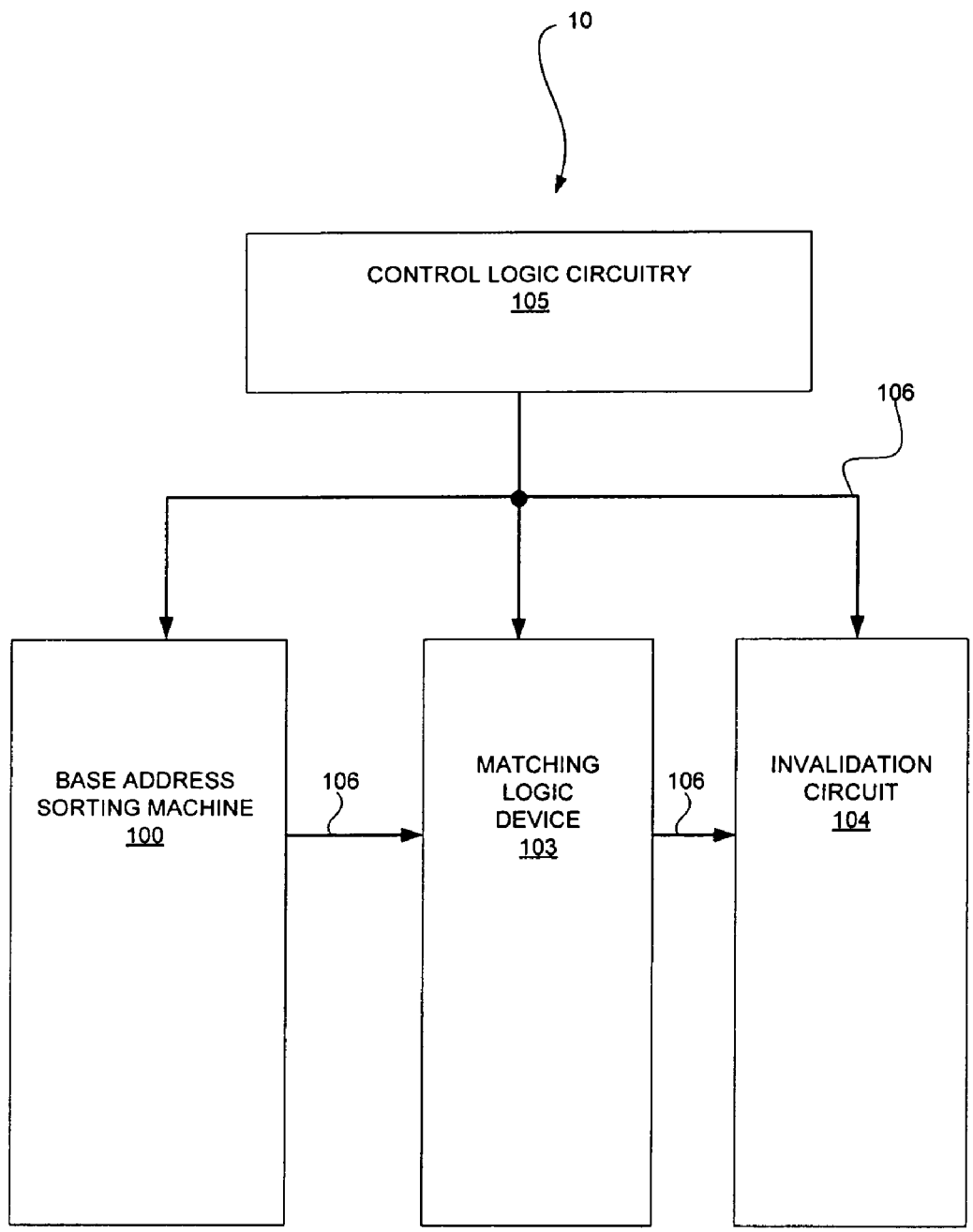
FIG. 1 illustrates a block diagram of a routing device in a multi-port switch that includes control logic circuitry, an address sorting device, a matching logic device, and an invalidation circuit in accordance with an embodiment of the present invention.

FIG. 1 illustrates a block diagram of a routing device for a PCI Express multi-port switch. Embodiments of the present invention are intended to function in a PCI Express switch that is enabled to sort base register addresses into an ascending or descending order. The use of sorted base register addresses for the purpose of rapid binary search switching in a PCI Express switch is described at length in the related and co-pending U.S. patent application Ser. No. 11/395,715, entitled "Base Address Registers Binary Search Device And Method" filed simultaneously with the present application, assigned to the assignee of the present application and incorporated by reference herein in its totality.

In FIG. 1, routing device 10 includes control logic circuitry 105, a base address sorting device 100, a base address matching logic device 103, and an invalidation circuit 104. Routing device 10 is located at each port of the multi-port device to route a new communication packet into the correct port and thus to the correct external device. In the present embodiment, base address sorting device 100 includes base address matching logic device 103 that generates an output that is coupled to invalidation circuit 104. Control logic circuitry 105 are electrically connected to base address sorting device 100, base address matching logic device 103, and invalidation circuit 104 via internal links 106 for controlling the operations of these devices.

It is noted here that this discussion of embodiments of the present invention refers to use in a Peripheral Component Interface Express (PCIe) switch operating as part of a PCI Express bus. However, implementation of embodiments of the present invention is not limited to such applications.

PCI Express communications, it is noted, are switched-packet serial communications, meaning that information communicated in PCI Express is contained in a packet that includes a header having an address and, if data is being communicated, a payload. Because a header is added at a transaction layer in the PCI Express structure, a packet containing data and a header is commonly referred to as a transaction layer packet (TLP).

It is also noted that a "base address register," as referred to in this description, denotes a register that holds a base address, a limit address, and a port designation or name. Since a bus number can also be used to route some types of packets in a PCI Express serial switch, a bus number can be included in the contents of a base address register.

An array of base address registers, one register for each other port in a switching device, is assigned to each port connected to a device with which the PCI Express switch communicates. At each port in a three-port switch, for example, there are three base address registers for a total of nine. In a large port-count switch, such as one having sixteen ports, for example, each port has an array of sixteen base address registers, for a total of 256. Each base address register contains a port name and the base and limit addresses assigned to external devices connected, either directly or indirectly, to its named port. The array of base address registers is encountered by the routing of an incoming PCI Express packet and the incoming packet is directed to the named port of the base address register whose address contents encompass the target address contained in the packet's header.

For a communication packet to be routed to a device by the switch, the address in the packet header must lie between the base address and the limit address assigned to the port that is connected to the device. Each port in a PCI Express switch is connected to only one external device but an external device can be another switch or a bridge connected to additional devices.

A PCI Express switch, in this embodiment of the present invention, is able to dynamically reassign addresses and address ranges to the ports in the switch. One example of a reason to dynamically reassign addresses is a requirement by the operating system to increase a memory allocation, such as when a software application discovers a need for more memory space than was allocated to it at system start up.

Another example is a hot-switched occurrence, such as a One-GByte flash memory device being plugged into a USB port in place of a 256 Mbyte device, all while the associated computer is running. The base address and the limit address are, in this example, changed in the base address register associated with the USB port. The increased memory size in this example may require a limit address that is outside the range of addresses available above the existing base address. The base address must then be changed to an address with an associated address space sufficient to encompass the new allocation. Reassignment is accomplished with a configuration command packet.

Embodiments of the present invention are able to accommodate reassignment of addresses in the base address registers by the use of commands contained in configuration packets. A configuration packet, it is noted, is one of the various types of packets defined in PCI Express. The others include memory read/write, input/output read/write, and completions. Some types of packets that requests an action, such as a base address reconfiguration, require a response that indicates completion of the action and a possible product of the action, such as data. A response can also be a system message.

It is noted here, again, that embodiments of the present invention enhance the performance of serial switches by enabling a rapid binary search of base addresses. The rapid binary search, described fully in the aforementioned co-pending application Ser. No. 11/395,715, is enabled by the sorting of base addresses into a descending or ascending order. The insertion of new base addresses and the subsequent sorting of the base addresses held in the base address registers is described fully in the present application.

In one embodiment of the present invention, when a configuration command packet containing a new base address intended for a base address register associated with a port arrives at the PCI Express switch, base address sorting device 100 inserts the new address into the correct slot and sorts the array of base address registers in a predetermined order. During normal packet communication operations, base address matching logic device 103 uses the sorted list of base address registers to determine which external device is the intended target of each incoming packet containing a target address. A search for the proper base address register involves a comparison of the packet header target address and the base addresses contained in the base address registers. When the base address registers are sorted in descending order, for example, the first base address register encountered whose base address is smaller than the target address is the base address register of interest. As noted in related and referenced patent application Ser. No. 11/395,715, this avoids a comparison of each incoming target address with every base address in every base address register.

Figure 2:
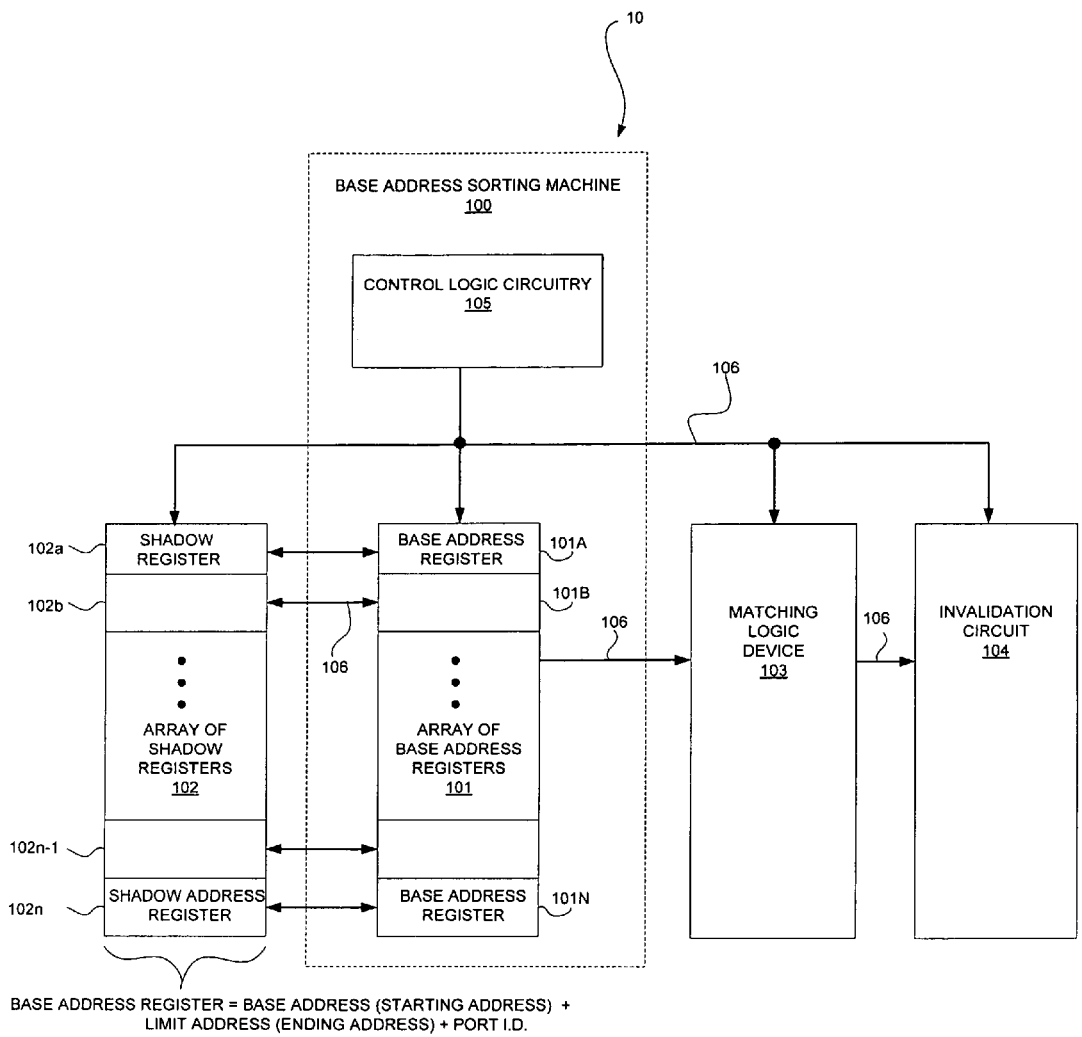
FIG. 2 illustrates an address sorting device that includes an array of shadow registers electrically connected to an array of base address registers and control logic circuitry in accordance with an embodiment of the present invention the present invention.

Referring now to FIG. 2, a base address sorting device 100 is shown that includes an array of shadow registers 102 connected to an array of base address registers 101 and control logic circuitry 105. Control logic circuitry 105 is electrically connected to the array of shadow registers 102 and the array of base address registers 101 via an internal link 106. In one embodiment, the array of base address registers 101 includes a plurality of base address registers 101$_A$-101$_X$. Each base address register 101$_A$-101$_X$ in the array of base address registers 101 has a base address, a limit address and a port name, or number. The base address of each base address register 101$_A$-101$_X$ is also known as a starting address. Each base address of base address registers 101$_A$-101$_X$ is non-conflicting and designates an identifying address of a specific external device. This means that each external device is assigned to only one base address and that no address assigned to one port is within the address range of any other port. The limit address is the ending address of that device. The difference between the limit address and the base address is the address range of the device associated with that base address register. Some base address registers 101A-X can have negative base address ranges, which means that their ending address is less than their starting address. In this case, as discussed above, the device is assigned no address range and is an invalid device.

It is noted here that address assignments, in this embodiment of the present invention, are accomplished by an operating system. At system startup, each device with which the operating system needs to communicate is assigned a base and limit address. The assigned addresses of devices connected to a PCI Express switch are stored in, among other locations, the base address registers at each port in the associated switch. From the viewpoint of the operating system, however, each port has only its own base address register.

Again referring to FIG. 1, invalidation circuit 104 compares the limit address of each device address assignment against the associated base address in the base address register associated with the port to which the device is connected. Since addresses are always considered for lowest to highest, if the limit address is lower than the base address, establishing a negative address range, invalidation circuit 104 flags the selected port as invalid. Invalid port address assignments are, when sorted, always sorted below valid address assignments.

In the present embodiment, the array of base address registers 101$_A$-101$_X$ is arranged in a predetermined descending order of base addresses so that the highest base address is contained the first element 101$_A$ of array of base address registers 101 and the lowest base address is the last base address register 101$_X$. However, it is understood that any predetermined order of the array of base address registers is within the scope of the present invention.

Additionally, in this embodiment of the present invention, each base address register contains the number of the port whose address it contains. The port number in the base address register is also known as "naming." When an external device is assigned a new address, the addresses and port names in the base address registers are resorted. The physical registers that hold base and limit addresses and port names are, to accomplish the re-sorting, renamed if the ports to which they refer change.

Again, in the present embodiment, each external device is assigned to a base address register 101$_A$-101$_X$ by virtue of its base and limit addresses being stored in the base address register associated with the named port to which the external device is connected. For example, a memory device connected to base address sorting device 100 may have a large address range assigned to it above its base address. Another external device such as a scanner may have zero address range for an I/O type address but it may have a non-zero address range for memory addressing. An external device may have four different types of address spaces, e.g., memory address, pre-fetchable memory address, I/O address, and bus or device function number. Base address registers, in this embodiment of the present invention, are re-configured by configuration commands. The array of shadow registers 102 also includes a plurality of shadow registers 102a-n. The connection between element 102a-n of array of shadow address registers 101 and element 101$_A$-101$_X$ of array of base address registers 101 is a one-to-one connection. In other words, each shadow register 102a-n in array of shadow registers 102 is connected to only one base address register 101$_A$-101$_X$ in array of base address registers 101 and has, prior to receiving a new configuration command, identical content with its associated base address register. Thus, each element 102a-n of array of shadow registers 102 has a non-conflicting base and limit address. However, during the sorting process initiated by control logic circuitry 105 after the receiving of a configuration command, array of shadow registers 102 may not have the same base address and limit address contents as array of base address registers 101. In this embodiment of the present invention, a new configuration of a base address register can cause control logic circuitry 105 to initiate a port base address register re-sorting.

As noted previously, when a system is started up, an operating system assigns addresses to each external device connected to a port in the PCI Express switch. In order to accommodate possible changes without interrupting operation, gaps are typically left above each limit address, below each base address. Resorting of port-associated addresses is only required when assignment of a new address range would put a limit address above the next higher base address. To avoid interference, a new base address is assigned in an address space that has sufficient room to accommodate the new, larger, range. In this embodiment of the present invention, in order to work with the aforementioned invention described in the related application assigned Ser. No. 11/395,715, the base addresses in base address registers 101$_A$-101$_X$, are sorted into descending order, meaning that the highest numerical address value is encountered first in scanning through the base address registers.

It is noted here that some address reassignments do not require re-sorting of base addresses in the base address registers. However, since determining whether re-sorting is actually necessary would entail additional logic, this embodiment of the present invention initiates a re-sorting upon each address reassignment.

Again referring to FIG. 2, when a new configuration command is received at base address sorting device 100, control logic circuitry 105 decides whether a new base address in the new command packet belongs to the range of base and limit addresses represented by the array of base address registers 101. If the address value of the new command belongs to the range of base addresses of array of base address registers 101, control logic circuitry 105 proceeds with the sorting operation. In the sorting operation, control logic circuitry 105 rotates the array of shadow registers 102 and compares the base address of the top shadow register to the base address in the new configuration command packet. When the new base address is greater than that of the first shadow register, control logic circuitry 105 swaps the base address of the new configuration with the base address of the first shadow register. Control logic circuitry 105 continues comparing and swapping until an insertion point is located.

After locating an insertion point, in this embodiment, control logic circuitry 105 shifts or unidirectionally rotates the array of shadow registers 102 to restore them to their original order with the largest base address being held in the shadow address register at the logical top of the array of shadow registers. Because the number of rotations necessary to restore array of shadow registers 102 is known by control logic circuitry 105, base address sorting device 100 needs only one comparator. Now the target shadow address register is renamed and its entire content is replaced by the new content carried by the new configuration command. Furthermore, the addresses that are displaced in the reassignment are invalidated.

At the final stage of the reassignment and sorting operation, control logic circuitry 105 copies the entire contents of array of shadow registers 102 to the array of base address registers 101, in one clock cycle. Matching logic device 103 receives the output of array of base address registers 101 to locate base address register $101_A$-$101_X$ at the insertion point.

Figure 3:
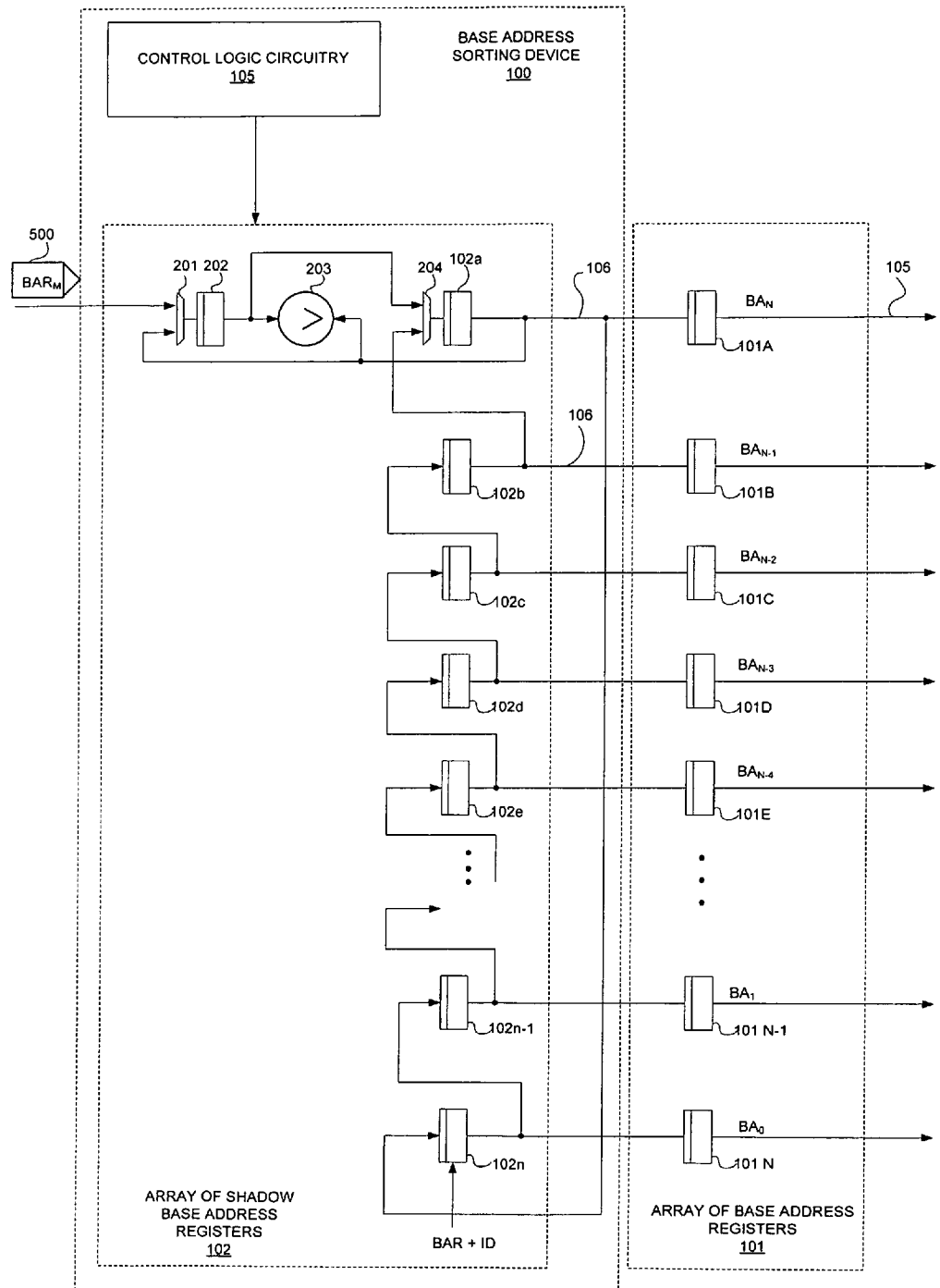
FIG. 3 illustrates a detailed view of an array of shadow registers connected to an array of base address registers in accordance with one embodiment of the present invention.

Now referring to FIG. 3, the schematic diagram of array of shadow register 102 and array of base address registers 101 is illustrated. As shown in FIG. 3, the connection between an element in the array of shadow registers 102 and an element in the array of base address registers 101 is a one-to-one connection. That is, each shadow register is electrically connected to only one base address register and the associated registers have identical contents before and after the sorting process. During the sorting process, the base and limit address contents of array of base address registers 101 do not shift. The base and limit address contents of array of shadow registers 102 are shifted during the sorting process without interruption of the array of base address registers 101 and the routing operation of matching logic circuit 103.

When the sorting process is completed, the array of shadow registers 102 is in a predetermined order, either ascending or descending, and the contents are copied over to the array of base address registers 101. In the present embodiment, as shown in FIG. 3, the predetermined order is a descending order of base address from top base address register 101A to bottom base address register 101P. However, it is understood that any predetermined order of array of base address registers 101 is within the scope of the present invention.

As shown in FIG. 3, a first shadow register 102a is connected to a last shadow register, or a bottom shadow register, 102n and to a first base address register 101A having a base address $BA_N$. Last shadow register 102n is connected to a preceding shadow register 102n-1 and to a last base address register 101N having a base address $BA_0$. Shadow register 102n-1 is electrically connected to a preceding shadow register (not shown) and to a base address register 101N-1 having a base address $BA_1$. This pattern continues until top shadow register 102a is reached. A shadow register 102e is electrically connected to a preceding shadow register 102d and to a base address register 101E having a base address $BA_{N-4}$. Shadow register 102d is electrically connected to a preceding shadow register 102c and to a base address register 101d having a base address $BA_{N-3}$. Shadow register 102c is electrically connected to a preceding shadow register 102b and to a base address register 101c having a base address $BA_{N-2}$. Shadow register 102b is electrically connected to first shadow register 101A and to a base address register 101B having a base address $BA_{N-4}$. Shadow register 102b is also input to a second multiplexer 204. First multiplexer 201 receives a new configuration command 500 having a new base address $BA_{NEW}$ and a second input from top shadow register 102a. The output of first multiplexer 201 is connected to a buffer register 202. Buffer register 202 is connected to a comparator 203. Comparator 203 is connected to second multiplexer 204. Second multiplexer 204 receives its first input from buffer register 202 and its second input from shadow register 102b. The output of second multiplexer 204 is input into first shadow register 102a. In the present embodiment, first multiplexer 201, second multiplexer 204, comparator 203 are part of the array of shadow address registers 102. In another embodiment, first multiplexer 210, buffer register 202, comparator 203, and second multiplexer 204 are part of control logic circuitry 105.

It is noted here that configuration command $BAR_M$ 500, in this example, contains a new base address $BA_{NEW}$ (not shown) for a port in a serial switch. In another example, new configuration command $BAR_M$ 500 contains a new limit address to change the address range associated with an existing base address.

Referring again to FIG. 3, the new configuration command, having a new base address $BA_{NEW}$, is received at the first input of first multiplexer 201. The base address $BA_1$ of top shadow address register 102a is compared with the base address $BA_{NEW}$ of the new command by comparator 203. If the base address $BA_{NEW}$ contained in new configuration command 500 is not greater than the base address of the top shadow register 102a, the base addresses of each shadow register 102a-n in the array of shadow registers 102 are shifted or unidirectionally rotated in the array. More particularly, the base address written in shadow register 102n is shifted up to shadow register 102n-1. The base address in shadow register 102b is shifted to the base address of the top shadow register 102a and so forth. The sorting process continues and each element of array of shadow registers 102 is shifted one logical position until the base address $BA_{NEW}$ in configuration command 500 is greater than the base address of top shadow register 102a. When this condition occurs, base address contained in configuration command 500 is swapped with the base address of top shadow address register 102a. It is understood that any logical direction of rotation or shifting of the array of shadow registers 101 is within the scope of the present invention. The shift of array of shadow registers 102 can logically be clockwise or counterclockwise. The unidirectional rotation can also logically be vertical or horizontal. It is noted that a logical concept of direction of rotation or shifting is discussed herein for the purpose of clarity. The logical concept is not necessarily reflected in the physical layout or arrangement of any device in which the present invention is embodied.

It is noted that new configuration command 500 always contains either a port address or a port name to designate which port is to be re reconfigured. When the shadow register containing the same port number as new configuration command is encountered in the comparison and rotation discussed herein, the old register address contents are invalidated as discussed above. In the continuing comparisons, an invalid address is always considered to be smaller than any valid address. In this way, the old, invalidated, addresses do not find their way back into the array of shadow registers 102.

Continuing with FIG. 3, after second multiplexer 204 multiplexes out the base address contained in new configuration command 500 and swaps it with the base address contained in top shadow register 102a, control logic circuitry 105 continues to shift and compare the contents of each register in the array of shadow registers 102 with the contents of buffer register 202. Control logic circuitry 105 calculates how many shifts it needs to restore the array of shadow registers 101 to the original descending or ascending order.

As a result, base address sorting device 100 needs only one comparator. Once the base address $BA_{NEW}$ of new command 500 is swapped with the base address of the top shadow register 102a by first multiplexer 201 and second multiplexer 204 and array of shadow registers 102 has been restored to its original order, control logic circuitry 105 copies the array of shadow registers 102 into the array of base address registers 101. At this instance, the target base address register is renamed and its content is replaced by the new content $BA_{NEW}$ in configuration command 500.

Renaming, it is noted, is the assignment of a new port number or port name to a physical base address register. The renamed base address register contains the newly assigned base and limit addresses assigned to the external device served by the named port.

Figure 4:
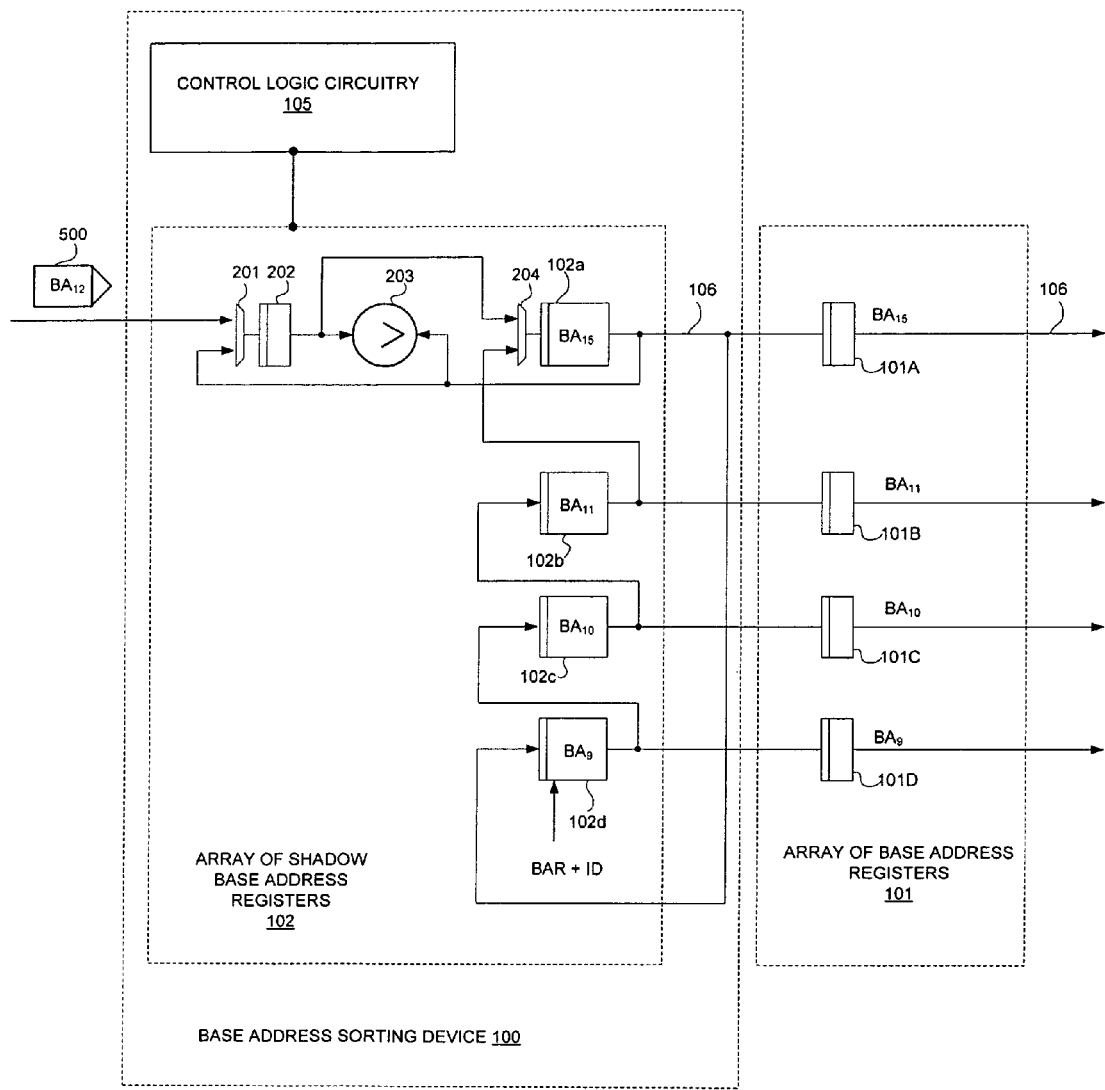
FIG. 4 illustrates a schematic diagram of an exemplary four-element array of shadow registers connected to an array of four-element base address registers shown in FIG. 3 to illustrate the operating principle of the base address sorting device of FIG. 1 in accordance with an embodiment of the present invention.

Now referring to FIG. 4, a schematic diagram of an array of shadow registers 102 and an array of base address registers 101 is shown to clearly illustrate the operating principle of base address sorting device 100. For this example, base address sorting device 100 is implemented in a four-port serial switch. Since each base address sorting device 100 has a complete set of base address registers 101A-D, one for each port in the switch, and a complete set of shadow registers 102*a-d*, a total of eight address registers is shown in FIG. 4.

Initially, in the example illustrated in FIG. 4, first (top) shadow register 102*a* and the associated first base address register 101A, assigned to upstream port 1, for example, both contain a base address $BA_{15}$. Second shadow register 102*b* and its associated second base address register 101B, assigned to downstream port 2, for example, have a base address $BA_{11}$. Third shadow register 102*c* and third base address register 101C, assigned to port 4, have a base address $BA_{10}$. Fourth shadow register 102*d* and fourth base address register 101D, assigned to port 3, have a base address $BA_9$.

Continuing with FIG. 4, when a new configuration command packet 500 having, for example, a base address $BA_{12}$ and is intended to reassign port 4, is received at the input of first multiplexer 201. First multiplexer 201 will then forward base address $BA_{12}$ of the new configuration command to buffer register 202. Comparator 203 compares the base address $BA_{12}$ of buffer register 202 with the base address $BA_{15}$ of top shadow register 102*a*. $BA_{12}$ is not greater than $BA_{15}$, comparator 203 instructs second multiplexer 204 not to swap base addresses. At that moment, control logic circuitry 105 shifts the base addresses registers 102*a* and 102*d* such that the base address contained in top shadow register 102*a* will rotate to bottom shadow register 102*d*. More particularly, bottom register 102*d* now contains the base address $BA_{15}$ and port 1 assignment. The base address of bottom shadow register 102*d* is shifted up to preceding shadow register 102*c* such that shadow register 102*c* contains the base address $BA_9$ and port 3 assignment. Base address $BA_{10}$ and port 4 assignment of shadow register 102*c* are shifted up to preceding shadow register 102*b* such that shadow register 102*b* contains base address $BA_{10}$ and port 4 assignment. Base address $BA_{11}$ and port assignment 2 of shadow register 102*b* are shifted up to preceding shadow register 102*a*.

At this point, in this example, comparator 203 determines the base address content of buffer 202 is larger than the base address content of shadow register 102*a* ($BA_{12}$>$BA_{11}$). Control logic 105 swaps the address and port number contents of shadow register 102*a* with the address and port number contents of buffer 202, putting $BA_{12}$ and port assignment 2 into buffer 202 and $BA_{12}$ and port assignment 4 into shadow register 102*a*.

The shadow register contents are shifted again, as discussed above. Shadow register 102*a* now holds base address $BA_{10}$ and port assignment 4, shadow register 102*b* holds base address $BA_9$ and port assignment 3, shadow register 102*c* holds base address $BA_{15}$ and port assignment 1, and shadow register 102*d* holds base address $BA_{12}$ and port assignment 4.

Next, referring still to FIG. 4, control logic circuitry 105 uses comparator 203 to compare the base address $BA_{10}$ in top shadow register 102*a* to base address $BA_{11}$ in buffer 202. In this example, $BA_{11}$ is greater than $BA_{10}$ and the contents of the buffer and the shadow register are swapped.

At this point, in this embodiment, base address $BA_{10}$, because it is associated with port 4 which is reassigned by configuration command 500, is invalidated. As noted above, an invalid address is always presumed to be smaller than a valid address. As a result, control logic circuitry 105, determines that invalid address $BA_{10}$ is smaller than any other valid address and no further swapping would occur, even if there were other addresses to compare.

The address contents in the array of shadow registers are now shifted again, resulting in $BA_{15}$ and port 4 assignment being in the top shadow register, with the other address/port name contents arranged in descending order in the array of shadow registers. Control logic maintains the count of swaps and shifts, so it knows how far to shift the array of base addresses in order to bring the highest base address, $BA_{15}$ in this example, to the top register.

It is noted here that the terms "top" or "highest," when used to refer to either shadow registers or to base address registers, are used in a logical sense. The terms are not meant to imply a physical or electronic relationship.

When the new address and port assignment are inserted into the array of shadow registers and the register contents are sorted into the specified order, either ascending or descending, the entire array of contents are copied into the associated base address registers in each array of base address registers at each port in the serial switch. The copying occurs in a single system clock tick. This ensures that the inserting, sorting, and shifting do not interrupt the normal operation of the serial switch. In this embodiment of the present invention, inserting and sorting occur at all ports in the serial switch concurrently, with the sorted contents of the array of shadow registers being copied simultaneously to their respective associated base address arrays.

Figure 5:
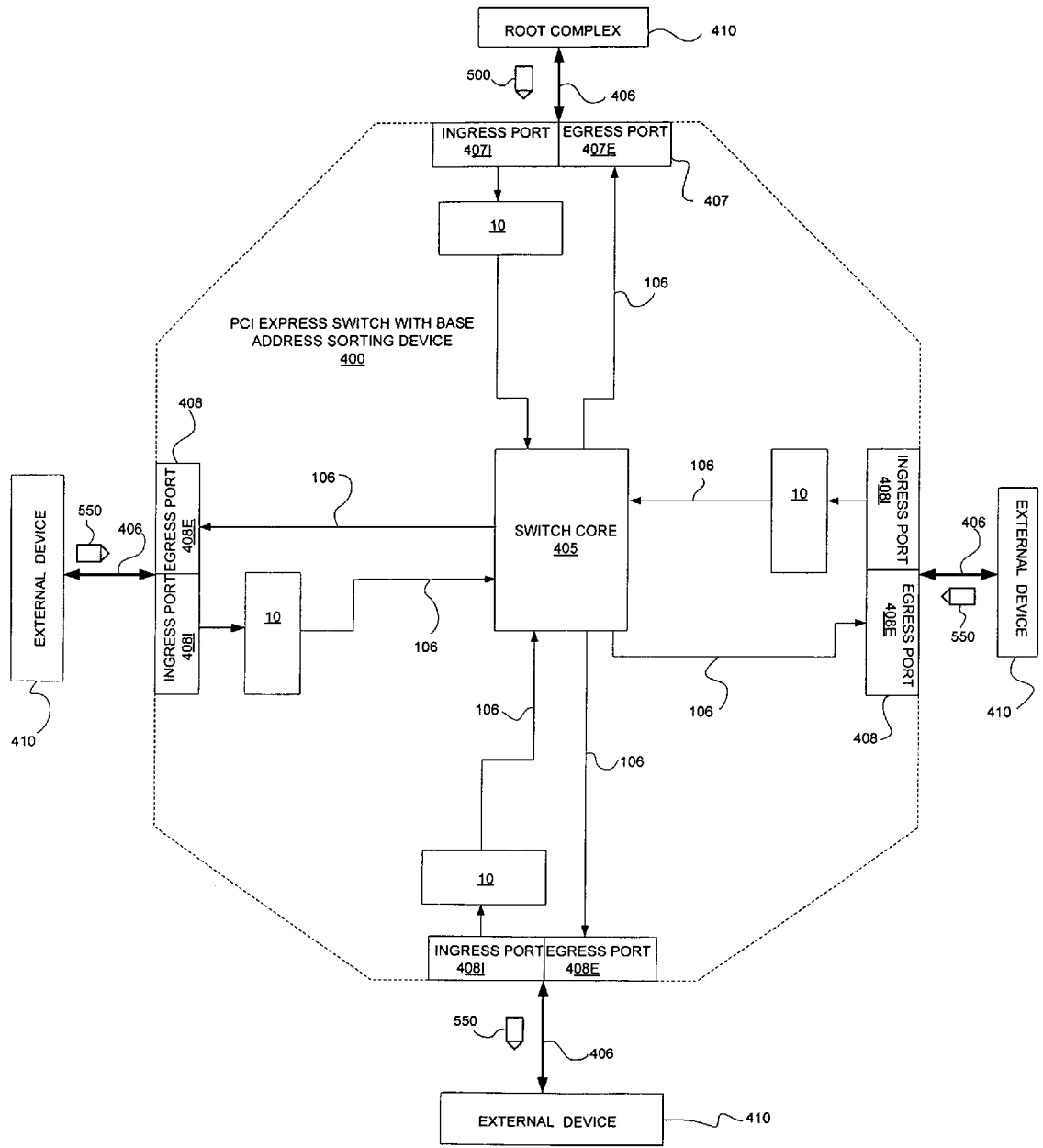
FIG. 5 illustrates a Peripheral Component Interconnect Express (PCIe) switch that includes the base address sorting device of FIG. 2 in accordance with an embodiment of the present invention.

Now referring to FIG. 5, a block diagram of a serial switch 400 is shown. The serial switch uses routing device 10 of FIG. 1 at each port to facilitate communication of the external devices 410 connected to the switch. In one embodiment of the present invention, serial switch 400 is a PCI Express switch. Serial switch 400 employs routing device 10 that contains base address sorting device 100. Matching logic device 103 is electrically connected to and controls a switch core 405 via internal link 106. Serial switch 400 communicates with external devices 410 via PCI Express links 406. As discussed previously, the term PCI Express as used in the present invention includes devices, protocols, operations that conform to the requirements of the PCI Express Base Specification. The term "PCI Express Base Specification", as used in the present application, includes all PCI Express standards, including but not limited to PCI Express Standard versions 1.0, 1.0a, and 1.1 published by PCI Signal Interest Group (PCI-SIG).

In the present embodiment, as illustrated in FIG. 5, serial switch 400 is implemented as a four port switch. In another embodiment, serial switch 400 includes sixteen or more ports enabled to communicate with external devices 410. In one embodiment, serial switch 400 includes 15 ports downstream ports 408 and an upstream port 407. Upstream port 407 further includes ingress terminal 407$_I$ and egress terminal 407$_E$. Ingress terminal 407$_I$ is an input terminal for receiving an incoming PCI Express communication packet from root complex 402. Egress terminal 407$_E$ is an upstream output port for sending out a communication packet routed through serial switch 400. Downstream ports 408 each include an ingress terminal 408$_I$ and an egress terminal 408$_E$ that are electrically coupled to switch core 405. Downstream ingress terminal $408_I$ is used to receive communication packet 550 from external devices 410 and downstream egress terminals $408_E$ send out communication packets to external devices 410. It is noted that, when external devices 410 are electrically connected to serial switch 400, external devices 410 can send and receive PCI Express packets through serial switch 400 over PCI Express links 406, to each other without entailing upstream, root complex time. At upstream port 407, the input terminal of routing device 10 is electrically connected to upstream ingress terminal $407_I$ and the output terminal of routing device 10 is electrically connected to switch core 405. The output of the switch is electrically connected to egress terminal $407_E$ of upstream port 407. Similarly, at each downstream port 408, the input terminal of routing device 10 is electrically connected to downstream ingress terminal $408_I$ and the output terminal of routing device 10 is electrically connected to a switch of switch core 405. The output of that switch is electrically connected to egress terminal $408_E$ of downstream port 408.

It is noted here that routing device 10, and its arrays of base address registers and shadow registers and control logic, is replicated at every port in serial switch 400. In one embodiment of the present invention, the sorting process of the shadow registers, and their subsequent content swap with the base address registers, is accomplished at every implementation of routing device 10 whenever a new configuration command is received by serial switch 400. In another embodiment, however, the array of shadow registers is only implemented at one point in the serial switch and the sorted base addresses, limit addresses, and port assignments are copied out to all ports' arrays of base address registers.

Referring still to FIG. 5, a communication packet 550 may be received at serial switch 400 at upstream port 407 or at any of downstream ports 408. In the present embodiment, a communication packet 550 can be a data or other packet that is in compliance with the PCI Express standard. External devices 410 can be PCI Express devices or bridges to other types of devices. Upon receiving communication packet 550, control logic circuitry 105 determines whether the target address contained in communication packet 550 falls within the address range contained in any of the base address registers in the array of base address registers 101. If the target address contained in communication packet 550 is within the range of array of any of the base address registers 101, serial switch 400 will forward the communication packet 550 to the port named in the base address register whose address range encompasses the target address.

In the present embodiment, the process discussed in association with FIG. 3 and FIG. 4 is used for inserting new base and limit addresses, and port assignments, in base address registers 101 and renaming and resorting them into a descending order. The descending order allows for the rapid switching described in related patent application Ser. No. 11/395,715, as discussed previously. In one embodiment of the present invention, serial switch 400 takes advantage of the fact that entries are added or modified during configuration procedure. Therefore, any configuration write command to array of base address registers 101 only needs to sort the content of new configuration command 500 into the correct slot and invalidate the old base address.

In the present embodiment, serial switch 400 is a single Integrated Circuit (IC) device that is implemented in a single semiconductor chip on which routing functions and logic of serial switch 400 are implemented. This includes a unidirectional shifting of the content of the shadow registers, a single comparator, swapping logic between two registers, and control logic. Thus, in practice, serial switch 400 with base address sorting device 100 can be implemented as a chipset which is a device coupled to a Central Processing Unit (CPU) to perform the desired system functionality. In another embodiment, serial switch 400 can be implemented on an Application Specific Integrated Circuit (ASIC).

Figure 6:
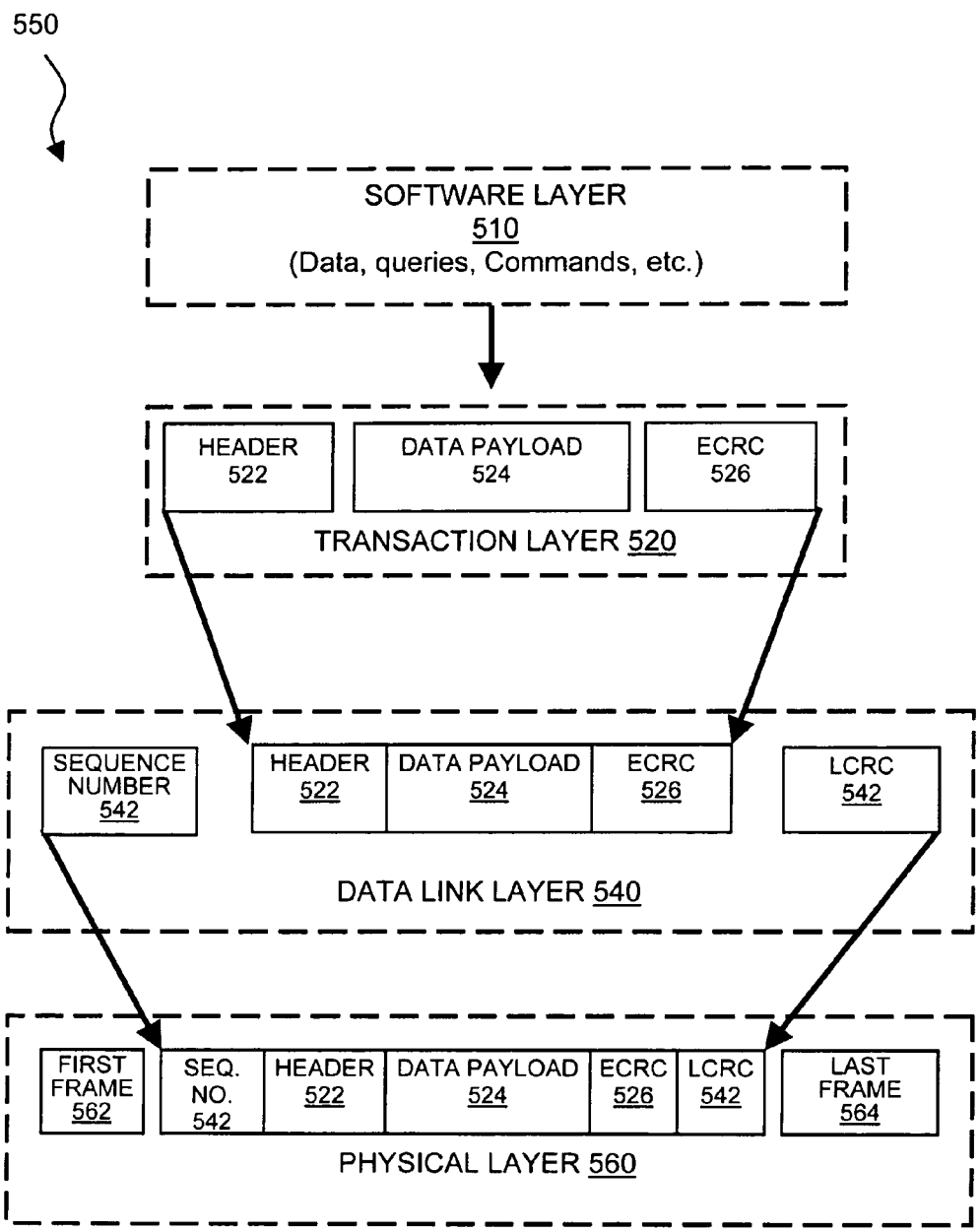
FIG. 6 illustrates the physical layer packet (PLP), the data link layer packet (DLLP), and the transaction layer packet (TLP) used in PCI Express communication in accordance with an embodiment of the present invention.

FIG. 6 shows different abstract layers of a typical PCI Express communication packet 550. Communication packet 550 can include data, commands, a query or other communication that a software function, software layer 510 in this illustration, intends for some device in the system. A configuration command 500, it is noted, can be one type of communication packet 550. Data becomes the payload 524 of a data packet. In a configuration command such as command 500, the payload is a new address or set of addresses for reconfiguration of a base address register in serial switch 400.

Referring still to FIG. 6, a transaction layer 520, the operating system for example, applies a header 522 and, possibly, a footer 526, to the data payload 524. Header 522 includes a target address which can be a device address, a port name, or a bus number in the system. In the example of configuration command packet 500, the target address is an address internal to serial switch 400. Footer 526 is often an End-to-end Cycle Redundancy Checking (ECRC) sequence.

Transaction layer 520 ensures that communication packet 550 is properly routed to its intended destination and that it arrives intact. In the example of configuration command 500, transaction layer 520 ensures the integrity of configuration command 500 and that it arrives intact at serial switch 400.

Data link layer 540 is, in this embodiment, the sequencing and routing function, such as is implemented by serial switch 400. The data link layer adds sequence number 542 and a Link Cycle Redundancy Check (LCRC) 546 to the communications packet. Physical layer 560 represents the hardware, vias, switching chips, etc, which are responsible for actually transmitting and receiving communication packet 550 across PCI Express link 406. Physical layer 560 adds a first frame 562 and a second frame 564 in addition to sequence number 542, LCRC 546, header 522, data payload 524, and ECRC 526. Link cyclical redundancy check (LCRC) 546 ensures integrity of packet 550 across PCI Express link 406.

It is noted that a serial switch in a PCI Express environment can be connected with one or more serial switches at its downstream ports. If, in this example, the target address of a configuration command 500 indicates a downstream switch and serial switch 400 is not the recipient, serial switch 400 forwards configuration command 500 to the downstream switch. A base address register associated with a downstream switch, it is noted, contains a base address and a limit address fully encompassing the ranges of addresses represented in the base address registers of the downstream switch.

If serial switch 400 is not the correct recipient of configuration command 500, or in the pathway between the root complex and the proper recipient, the configuration packet is returned to the upstream egress terminal $407_E$ subject to the rules for ordering and flow control for that port. If the target address contained in the header 522 of transaction layer packet 520 does not belong to the range of base addresses of upstream port 407, serial switch 400 performs further comparisons and rejects the packet as an Unsupported Request (UR). Thus, transaction layer 540 and other layers carry information and ensure data integrity of new command 500 that is necessary to perform the sorting process of base address sorting device 100.

Figure 7:
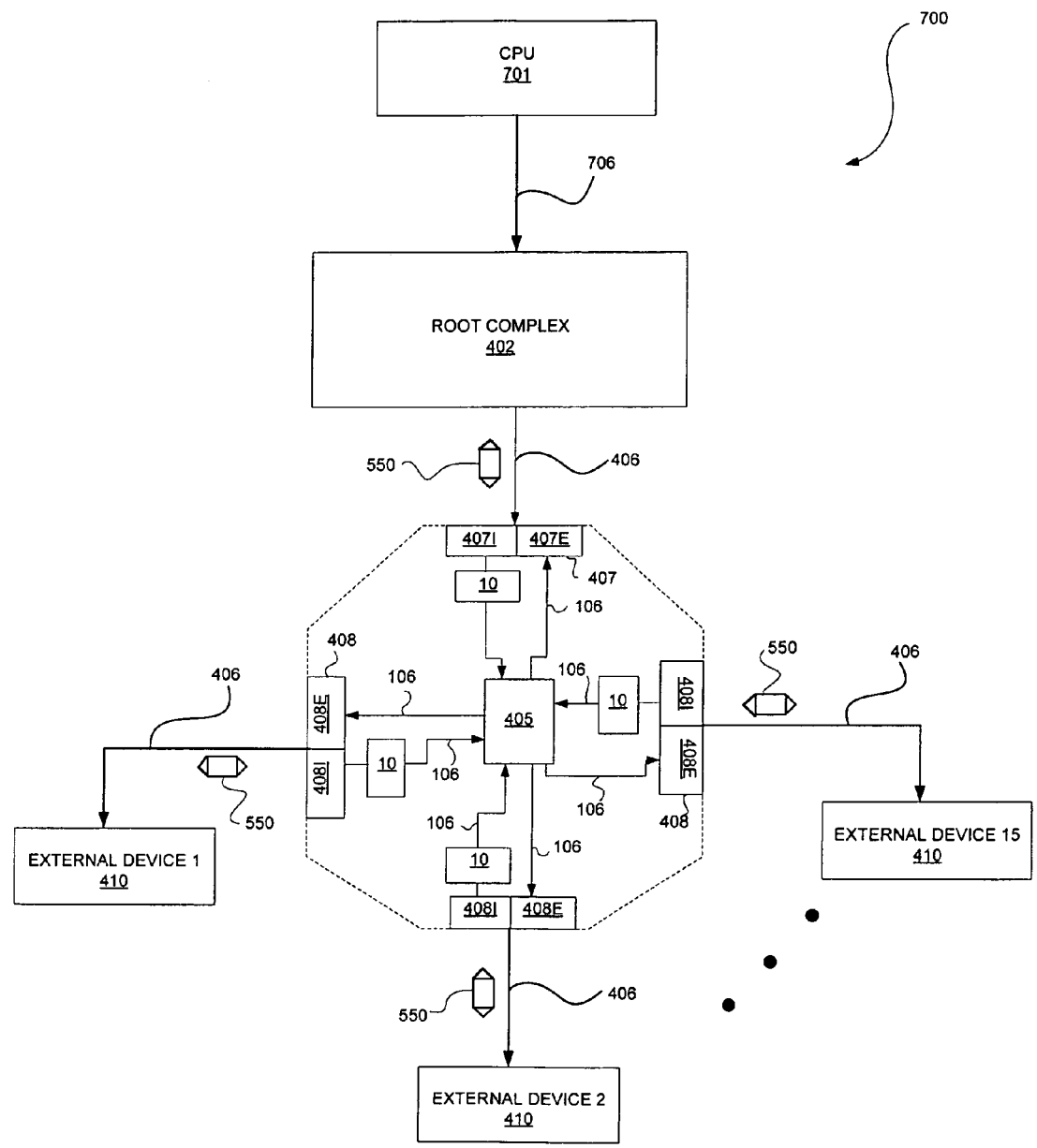
FIG. 7 illustrates a schematic diagram of a PCI Express system that is capable of communicating with a plurality of external devices in accordance with an embodiment of the present invention.

Now referring to FIG. 7, a schematic diagram of a typical PCI Express system 900 is shown that uses serial switch 400 to connect external devices 410 with root complex 402 and with each other. Serial switch 400 includes a routing device 10 that contains base address sorting device 100. In the embodiment that is shown in FIG. 7, serial switch 400 with base address sorting device 100 is implemented in a PCI Express system 700. PCI Express system 700 is a communication system which is typically found in computing system that includes a Central Processing Unit (CPU) 701, a root complex 402, serial switch 400 and one or more external devices 410.

The elements of PCI Express system 700 interconnected by PCI Express link 406 are the root complex 402, the serial switch 400, and the external devices 410. CPU 701 is electronically connected to root complex 402 but the link is not, in this embodiment, a PCI Express link. The heart of PCI Express system 700 is root complex 402. Root complex 402 is connected to PCI Express serial switch 400 by PCI Express link 406. External devices 410 communicate to root complex 402, and thus CPU 701, via serial switch 400. In PCI Express system 700, external devices 410 can independently communicate peer-to-peer with each other directly via serial switch 400. PCI Express system 700 uses communication packets 550 to communicate to root complex 402, serial switch 400, and external devices 410 connected thereto. Communication packets can be generated by the root complex 402, serial switch 400, or external devices 410.

Referring further to FIG. 7, the controller of PCI Express communications in system 700 is either CPU 701 or root complex 402. In the point-to-point diagram shown in FIG. 7, CPU 701 can communicate to any of the external devices 410. CPU 701 can open up communication with that external device 410 via serial switch 400, transmitting and receiving packets to and from external device 410, without affecting other external devices. Root complex 402 controls the operations of serial switch 400 and the PCI Express link 406 with external devices 410. Root complex 402 detects and initializes external devices 410, and controls PCI Express link 406 by default. Root complex 402 can retrieve information from external device 410. Upon receiving an instruction from root complex 402, serial switch 400 can route communications directly between external devices 410. External devices 410 can communicate with one another independently and in a peer-to-peer fashion without a master-slave control of either serial switch 400 or root complex 402.

External devices 410, it is noted, can be either endpoint devices or other serial switches such as serial switch 400. Endpoint devices can be, for example, printers, digital cameras, add-in cards, USB memory sticks, etc. Other serial switches 400 are not the end users of communication packets 550 sent to them; they forward the packets to other endpoint devices 410 to which they are connected. As discussed at length above, each external device 410 is assigned to a base address and a limit address. These base addresses are loaded and stored in a global address map and are retrieved as needed by root complex 402. Root complex 402 then maps these base addresses to the arrays of base address registers 101. The base address contained in each base address register in the arrays of base address registers 101 defines the starting point and memory addresses that each external device 410 has been allocated in the global address map.

Referring again to FIG. 7, the purpose of PCI Express link 406 is to connect external devices 410 to root complex 402 so that root complex 402 can communicate with them. Each PCI Express link 406 is composed of one or more lanes, and each lane is capable of transmitting packets in both directions at once. This full-duplex communication is possible because each lane is itself composed of one pair of signals: send and receive.

Referring again to FIG. 7, upon power-up and enumeration process, root complex 402 interrogates the entire PCI Express system 700 by traversing through system topology and locates all external devices 410 that are connected to the serial switch 400. After the configuration process is complete, each receiver interface of each external device 410 is prepared to monitor the integrity of new communication packet 550. Transaction layer packet 520 can move from one PCI Express link 406 to another PCI Express link 406, using routing information contained in header 522.

Referring again to FIG. 7, as a new communication packet 550, in the form of transaction layer packet 520, arrives at ports 407 or 408, serial switch 400 checks for errors by using ECRC 526 and LCRC 546, then determines whether to accept the traffic and use it internally, forward the traffic to the appropriate port 408, or reject the traffic because serial switch 400 is neither the intended target nor an interface to it. If the target address is within the range of array of base address registers 101, as found by the rapid switching concepts presented in related patent application Ser. No. 11/395,715, the communication packet is directed to the port named in the base address register whose base address and limit address encompass the target address of the packet. Again, the rapid switching is enabled by the ordering of base address registers in descending order as discussed at length in reference to FIGS. 3 and 4.

Figure 8:
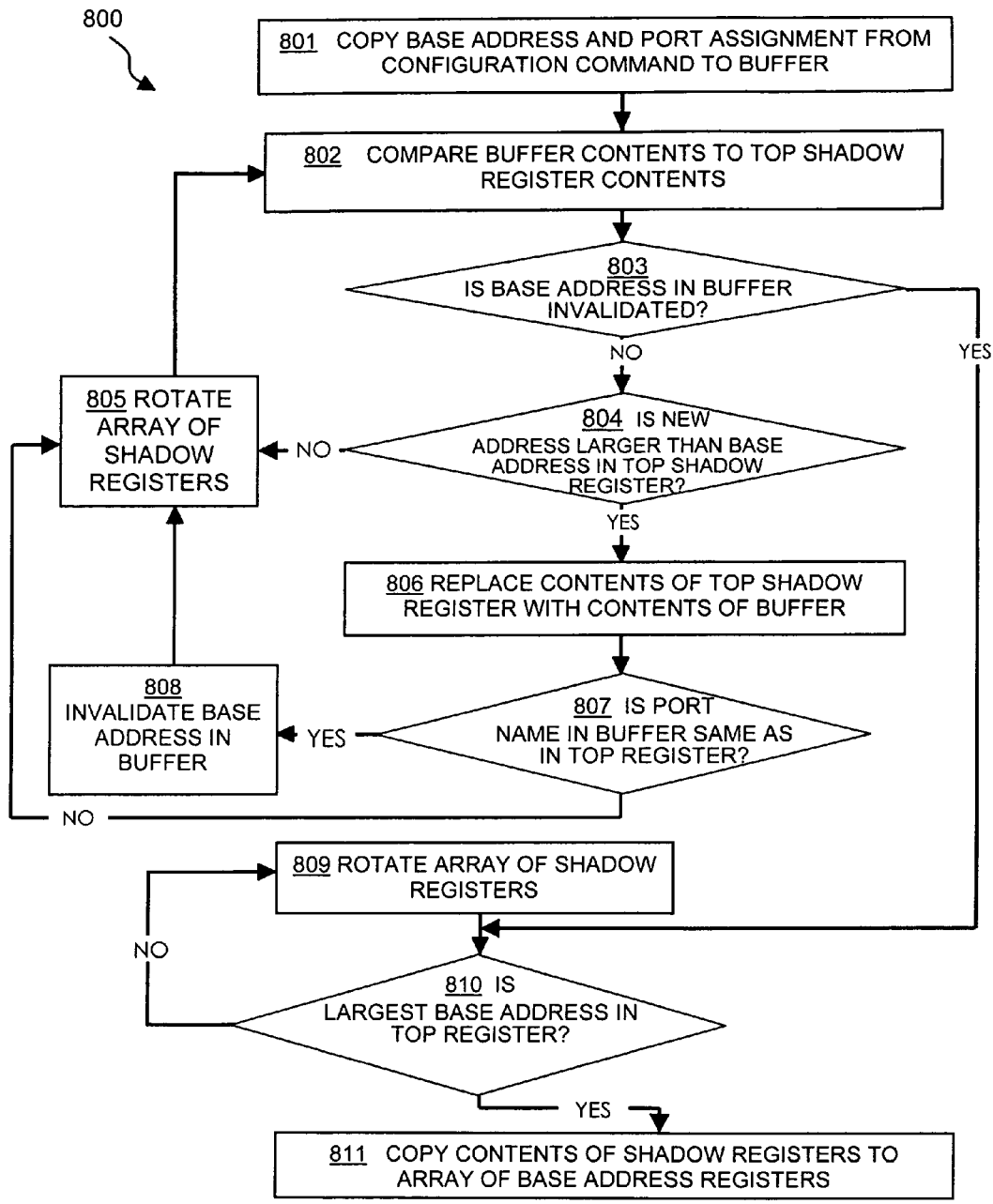
FIG. 8 illustrates a flowchart of a method for loading and sorting a new address configuration into an array of base address registers in accordance with an embodiment of the present invention.

Referring now to FIG. 8, a method 800 of reconfiguring an array of base address registers is shown. Method 800 includes comparing and swapping the contents of the top shadow register in an array of shadow registers, as discussed previously, with the contents of the new configuration command until the insertion point is located, rotating the array of registers to restore the original descending order, and copying the contents of the array of shadow registers into an array of base address registers. Method 800 can be implemented by a PCI Express system 700 that uses serial switch 400 with base address sorting device 100 to load new address and port assignments into array of base address registers 101 or it can be implemented by a serial switch 400 that is coupled to other circuitry.

Referring to step 801, upon the receipt of a configuration command, its contents including the base address, limit address if any, and port assignment or port name, are loaded into a buffer 202 in base address sorting machine 100. The buffer 202 is one input to a comparator 203, as was discussed earlier in reference to FIG. 3.

In step 802, the contents of the buffer 202 are compared to the contents of the top shadow register 102a of the array of shadow registers 102a-n. Top shadow register 102a, in this embodiment of the present invention, is the holder of the highest numerical base address value in the array of base addresses contained in the array of shadow registers 102a-n. It is noted again that the term "top" is not meant to imply a physical relationship but is used in reference to a logical relationship.

If 803 the base address in the buffer 202 has not been invalidated, it is then compared numerically 804 with the base address in the top shadow register 102a. If it is larger, the contents of the buffer 202 and the contents of the top shadow register 102a are swapped for each other.

After each comparison, the array of contents of the shadow registers, including base address, limit address and point assignment, is rotated, or shifted. In one embodiment, the rotation is unidirectional so that the contents of the top shadow register move to the bottom shadow register, the contents of the bottom register move to the next lowest, and so forth. The contents of the shadow register right below the top shadow register is shifted up to the top position. As discussed previously, rotation or shifting of the contents are logical references and do not imply a physical relationship or motion of registers or their contents. Comparison and rotation are accomplished, in this embodiment of the present invention, by control logic circuitry 105 and the use of the array of shadow address registers 102.

If 804 the base address in the buffer 202 is not larger than the base address in the top shadow register 102*a*, the contents of the array of shadow registers 102 are rotated 805. In one embodiment, rotation is from bottom to top, as discussed above. In another embodiment, the rotation is from top to bottom. In either case, the rotation only travels in one logical direction.

If 804 the base address in the buffer 202 is larger than the base address in the top shadow register 102*a*, the contents of the top shadow register 102*a* and the contents of the buffer 202 are swapped 806. Again, swapping is controlled by control logic 105.

If 807 the port name in the contents of buffer 202 is the same as the port name in the configuration command, the base address in the buffer 202, associated with the port name, is invalidated 808. As mentioned earlier in this description, an invalidated base address is logically considered to be numerically smaller than a valid address. Once an address is invalidated, it and its associated register contents are no longer swapped with the contents of top shadow register 102*a*.

The contents of array of shadow registers are again rotated as discussed above at 805 and the contents of the buffer 202 are compared 802 with the contents of the top shadow register 102*a*. When the base address in the buffer 202 is found to be invalidated 803, the contents of the array of shadow registers 102*a*-*n* are rotated 809, in the same direction as before until the largest base address is found 810 in the top shadow register 102*a*. When the largest base address is in the top register, the base addresses in the array of shadow registers are arranged in descending order and no further rotation occurs.

When the base addresses are in the final descending order, the shadow register contents from the entire array of shadow registers 102*a*-*n* are copied 811 into the base address registers of each port in serial switch 400. the copying can be accomplished, in this embodiment of the present invention, in a single tick of the controlling system clock. In this fashion, the rewriting of the base address registers is implemented without interruption of the normal operation of the switching logic and base address registers of serial switch 400.

FIGS. 9A through 9G illustrate an example of the reconfiguration of a new base address and port assignment into a stack of shadow registers in serial switch in accordance with an embodiment of the present invention. In this example, the serial switch 400, an example of which is shown in FIG. 4, is implemented as a five-port switch in which the upstream port is named port 0 and the four downstream ports are named ports 1 through 4. In this illustration, only the downstream port shadow registers are illustrated. The upstream port 0, in this example, is assigned the entire range of addresses that are accommodated within the switch, in this case 9 through 18. If any of the downstream ports receive a packet whose target address lies outside the range of 9-18, the packet is routed to the upstream port 0. Any packet with a target address within the range of 9-18 must be routed to one of the four downstream ports or it is an invalid target address. In this embodiment of the present invention, the base address associated with the upstream port is not sorted with those of the downstream ports.

Figure 9A:
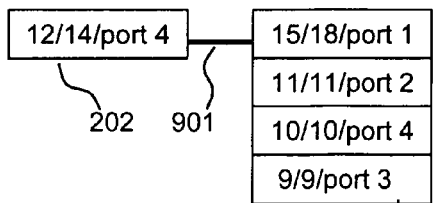
FIG. 9A through FIG. 9G illustrate an example of inserting and sorting a new address configuration in a serial switch in accordance with an embodiment of the present invention.

In FIG. 9A, a new configuration for port 4 has arrived at serial switch 400. The contents of the new configuration command 500, which is discussed in reference to FIGS. 3, 4 and 5, have been copied to buffer 202 by the action of step 801 in FIG. 8. As shown in this illustration, the new configuration of port 4 is for a base address of 12, a limit address of 14, and the port name 4. It is noted that these addresses and port names are shown here strictly for the purpose of illustration. Port names and addresses can be of any electronic convention appropriate to the system in which the serial switch is implemented.

It is noted that the addresses used in this example are for clarification purposes only. Actual I/O addresses, memory addresses, and pre-fetchable memory addresses can many binary digits in length. The addresses of "9", "10", "11", etc., are used for brevity and clarity in this description.

Still referring to FIG. 9A, the shadow registers 102*a* through 102*d* are shown with their contents arranged with the base addresses in descending order. It is noted that address assignments can be such that port numbers do not necessarily follow in descending order though their associated base addresses do. The shadow registers are shown with shadow register 102*a* holding port 1's assigned base address of 15 and limit address of 18 ("15/18/port 1"). Shadow register 102*b* is shown with port 2's base address of 11 ("11/11/port 2"). Port 2, in this example, is not shown with a limit address. A limit address, it is noted, is the same as a base address if the port is connected to a device having a single address.

Continuing further in reference to FIG. 9A, shadow register 102*c* is shown with port 4's old base address of 10 and no limit address ("10/10/port 4"). Shadow register 102*d* is shown with port 3's base address of 9 and no limit address ("9/9/port 3").

In this example, the new configuration is initiated by the operating system (OS). The OS has assigned a new address range to port 4. This could be in order to accommodate a newly plugged in piece of equipment, such as a USB device to a USB bridge connected to port 4, for example. The new address range exceeds the range available between port 4' existing base address of 10 and the next higher base address, that of port 2's 11. In order to accommodate the necessary address range, port 4 must be assigned a new base address, in this case, 12. Hence the new contents of configuration command 500, "12/14/port 4".

Figure 9B:
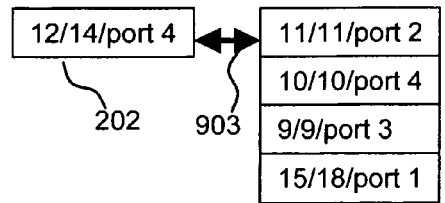

In FIG. 9A, the base address of the buffer 202, containing the contents of new configuration command 500 ("12/14/port 4"), is compared with the base address in top shadow register 102*a*, 15 (step 802 in FIG. 8). Since 15 is larger than 12, the contents of the buffer 202 and the register 102*a* are not swapped 901. The contents of the array of shadow registers 102 are rotated 902 (step 805 in FIG. 8) to move the base and limit address of port 1 from the top shadow register 102*a* to bottom shadow register 102*d*, the base address of port 2 from next-to-top shadow register 102*b* to top shadow register 102*a*, the base address of port 4 shadow register 102*c* to next-to-top shadow register 102*b*, and the base address of port 3 from bottom shadow register 102*d* to shadow register 102*c*, as shown in FIG. 9B. This rotation of the contents of the array of shadow registers 102 is unidirectional, meaning it always rotates in the same direction.

Figure 9C:
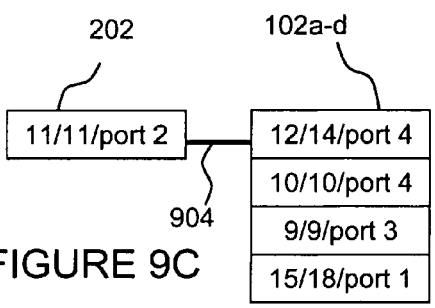

As illustrated in FIG. 9B, the base address in buffer 202 is again compared to the base address in top shadow register 102*a*. Here, 12 is larger than 11, so the contents are swapped 903 (step 806 in FIG. 8), as shown in FIG. 9C. The shadow register contents are again rotated 905.

Figure 9D:
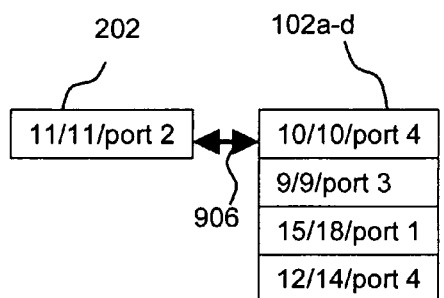

As shown in FIG. 9D, the contents of the array of shadow registers 102*a*-102*d* are now, in order, "10/10/port 4", "9/9/port 3", "15/18/port 1", and "12/14/port 4", respectively. The buffer 202 and top shadow register 102a are again compared (step 802) and, because 11 is larger than 10, swapped 906 (step 806).

Figure 9E:
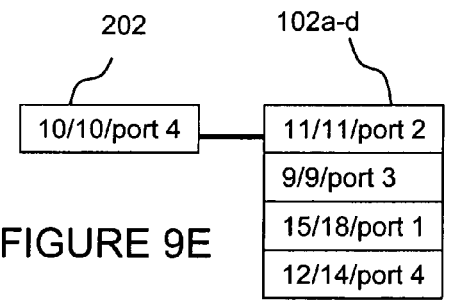

As shown in FIG. 9E, the buffer 202 now contains the old port address assignment for port 4. Because the port name in the buffer 202 is the same as the port name in the new configuration, the old base address for port 4 is invalidated (step 808 in FIG. 8). As discussed above, an invalid base address is always considered smaller than a valid address in any subsequent comparisons. The contents of the array of shadow registers 102a-d is again rotated 907.

Figure 9F:
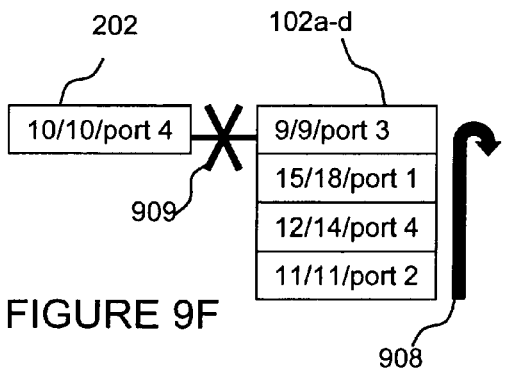

In FIG. 9F, buffer 202 contains the old base address assignment for port 4, base address 10. Because of rotation 907, the base address of 9 assigned port 3 is contained in top shadow register 102a. Because the old base address of 10 assigned to port 4 is invalid, the base address of 9 assigned to port 3 considered to be larger in the ensuing comparison and the contents of buffer 202 and top shadow register 102a are not swapped 909. The shadow register contents are again rotated 908.

Figure 9G:
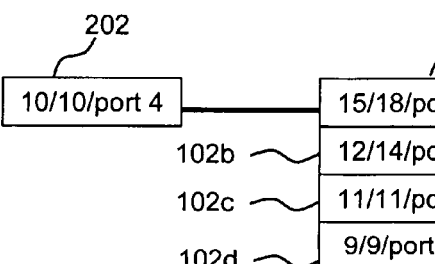

As shown in FIG. 9G, rotation 908 restores the descending order to the base address contents of array of shadow registers 102a-d. The contents are now arranged so that shadow register 102a contains "15/18/port 1", shadow register 102b contains "12/14/port 4", shadow register 102c contains "11/11/port 2", and shadow register 102d contains "9/9/port 3".

Once the descending order is restored in the array of shadow registers 102a-d, the largest base address is contained in top shadow register 102a, (step 810). The contents of the array of shadow registers 102a-d are then copied 910 directly into the array of base address registers 101A-101D (step 811). Copying the contents of the array of shadow registers 102a-d directly, or one-for-one into the array base address registers 101A-101D enables the copying to be accomplished in a single system clock cycle. By copying in a single clock cycle, or "tick", the normal switching functions of serial switch 400 are not interrupted. In this manner, reconfiguration of the base address registers takes place completely transparently to the system and avoids lag time that would otherwise be associated with reconfiguration.

Although specific embodiments of the invention have been disclosed, it will be understood by those having ordinary skill in the art that changes can be made to the specific embodiments without departing from the spirit and scope of the invention. Additionally, many modifications may be made to adapt a particular situation to the teachings of the present invention without departing from the central inventive concepts described herein. Furthermore, an embodiment of the present invention may not include all of the features described above. The scope of the invention is not to be restricted, therefore, to the specific embodiments, and it is intended that the appended claims cover any and all such applications, modifications, and embodiments within the scope of the present invention.

I claim:

1. A base address sorting device to create a sorted array of base address registers in which a target base address can be identified, for use in a serial switch, comprising:
    an array of shadow registers, each shadow register in said array of shadow registers being electrically coupled to a base address register of an array of base address registers, each of said base address registers containing a base address, wherein each of the base addresses contained in said base address registers designates an identifying address of a specific external device; and
    control logic circuitry electrically coupled to said array of shadow registers and said array of base address registers, said control logic circuitry operable upon receiving a configuration command comprising a new base address to implement a method for reconfiguring the contents of said array of base address registers, said method comprising:
        inserting said new base address of said configuration command into a shadow register in said array of shadow registers;
        sorting said array of shadow registers, including the shadow register having the new base address, into either an ascending or a descending order based on the base address of the shadow register, wherein the order of the shadow registers determines the order in which a search for the target base address in the array of base address registers will be performed; and
        copying said sorted contents of said array of shadow registers into said array of base address registers.

2. The base address sorting device of claim 1 further comprising a comparator and a buffer for storing a new base address contained in said configuration command, said comparator being electrically coupled to said array of shadow registers and to said buffer and operable to compare a base address contained by a first shadow register of said array of shadow registers to said new base address held by said configuration command.

3. The base address sorting device of claim 1 wherein said control logic circuitry is operable to sort said array of shadow registers by shifting the contents of said array of shadow registers until the array of shadow registers are sorted into either the ascending or the descending order based on the base address of the shadow register.

4. The base address sorting device of claim 1 wherein said array of shadow registers further comprises a first multiplexer and a second multiplexer electrically coupled to said array of shadow registers, said logic control circuitry, and to said array of base address registers.

5. The base address sorting device of claim 1 wherein said array of shadow registers is electrically coupled so as to be able to copy said contents of each shadow register in said array of shadow registers to another shadow register in said array and to each corresponding base address register in said array of base address registers.

6. The base address sorting device of claim 1 wherein inserting said new base address of said configuration command into a shadow register in said array of shadow registers further comprises:
    comparing a base address of a top shadow register to that of said new base address, and if the new base address is greater than the base address of the top shadow register, swapping the new base address with the base address of the top shadow register, or if the new base address is not greater than the base address of the top shadow register, unidirectionally rotating the array of shadow registers one logical position and comparing the base address of the top shadow register to that of the new base address and continuing the steps of unidirectionally rotating the array and comparing the base address of the top shadow register to that of the new base address until the new base address is greater than the base address of the top shadow register and then swapping the new base address with the base address of the top shadow register;
    rotating said array of shadow registers back to either the ascending or descending order; and
    copying said base address values of said array of shadow registers to those of said array of base address registers.

7. A switching device for switching a communication packet, comprising:

a plurality of communication ports, each of said plurality of communication ports coupled to an external electronic device;

a base address sorting device for creating a sorted array of base address registers in which a target base address can be identified, the base address sorting device comprising an array of shadow registers, each shadow register in said array of shadow registers being electrically coupled to a base address register of an array of base address registers, each of said base address registers containing a base address, wherein each of the base addresses contained in said base address registers designates an identifying address of a specific external device;

control logic circuitry electrically coupled to said array of shadow registers and said array of base address registers, said control logic circuitry operable upon receiving a configuration command comprising a new base address to implement a method for reconfiguring the contents of said array of base address registers, said method comprising:

inserting said new base address of said configuration command into a shadow register in said array of shadow registers;

sorting said array of shadow registers, including the shadow register having the new base address, into either an ascending or a descending order based on the base address of the shadow register, wherein the order of the shadow registers determines the order in which a search for the target base address in the array of base address registers will be performed; and copying said sorted contents of said array of shadow registers into said array of base address registers; and a switch core electronically coupled to each of said communication ports, the switch core enabled to direct the routing of said communication packet to an external device associated with the communication port.

8. The switching device described in claim 7, wherein said communication packet is a PCI Express packet.

9. The switching device described in claim 7, wherein each base address register contains a base address and a port name, said array of base address registers having the base addresses and associated port names for all of said communication ports in said switching device.

10. The switching device described in claim 7, further comprising:

a renaming device electronically coupled to said base address sorting device and enabled to rename a port name in a shadow register; and an invalidation circuit for invalidating an old base address when said old base address is replaced by inserted new base address.

11. The switching device described in claim 7 wherein each of said shadow registers in said array of shadow registers is electronically coupled to an adjacent shadow register so as to enable the contents of each of said shadow registers to be shifted to said adjacent shadow register.

12. The switching device described in claim 7 wherein said array of shadow registers further comprises a comparator electronically coupled between a shadow register in said array of shadow registers and an address buffer, said comparator operable to compare a base address in said first shadow resister to a base address in said buffer.

13. The switching device described in claim 7 wherein said switching device is a serial switch.

14. In a switching device, a method for reconfiguring a base address in an array of base address registers, said array of base address registers sorted into either an ascending or a descending order, wherein the order of the base address registers determines the order in which a search for a target base address in the array of base address registers will be performed, comprising:

receiving a configuration command comprising a new base address;

comparing the base address of a top shadow register in the array of base address registers to that of said new base address, and if the new base address is greater than the base address of the top shadow register, swapping the new base address with the base address of the top shadow register, or if the new base address is not greater than the base address of the top shadow register, unidirectionally rotating the array of shadow registers one logical position and comparing the base address of the top shadow register to that of the new base address and continuing the steps of unidirectionally rotating the array and comparing the base address of the top shadow register to that of the new base address until the new base address is greater than the base address of the top shadow register and then swapping the new base address with the base address of the top shadow register;

invalidating said old base address when the port name associated with said old base address is the same as the port name associated with said new base address;

rotating said array of shadow registers back to the ascending or the descending order; and copying said contents of said array of shadow registers into said array of base address registers.

15. The method described in claim 14 further comprising comparing said new base address of said configuration command to the address range of the upstream port in said switching device and, if said new base address of said configuration command is greater than said address range, sending said configuration command back to a root complex as an unsupported request.

16. The method described in claim 14 wherein said copying said contents of said array of shadow registers into said array of base address registers is completed in one clock cycle.

17. The method described in claim 14 wherein each shadow register in said array of shadow registers initially contains content identical to that of a corresponding base address register in said array of base address registers.

18. The method described in claim 14 wherein said switching device is implemented in a system conforming to PCI Express standards.

* * * * *